United States Patent
Takagawa

(10) Patent No.: US 6,491,427 B1
(45) Date of Patent: Dec. 10, 2002

(54) LID OF THE LIQUID CONTAINER AND THE LIQUID CONTAINER

(76) Inventor: Nobuyuki Takagawa, 5-12-20, Sagisu, Fukushima-ku, Osaka (JP)

( * ) Notice: Subject to any disclaimer, the term of this patent is extended or adjusted under 35 U.S.C. 154(b) by 39 days.

(21) Appl. No.: 09/643,349

(22) Filed: Aug. 22, 2000

(51) Int. Cl.[7] ............................. G01K 1/00; G01K 1/14; A47J 31/00
(52) U.S. Cl. ...................... 374/150; 374/208; 374/141
(58) Field of Search ................................ 374/207, 141, 374/150, 208, 162; 215/11.2, 230; 116/216; 220/201–202

(56) References Cited

U.S. PATENT DOCUMENTS

| | | | | |
|---|---|---|---|---|
| 3,952,596 | A | * | 4/1976 | Patel ........................ 73/363.9 |
| 4,104,916 | A | * | 8/1978 | Hofer ....................... 73/343 B |
| 4,609,916 | A | * | 9/1986 | Becker et al. ................ 99/283 |
| 5,063,836 | A | * | 11/1991 | Patel ........................... 99/281 |
| 5,183,998 | A | * | 2/1993 | Hoffman et al. ............ 219/492 |
| 5,193,437 | A | * | 3/1993 | Roberts et al. ................ 99/280 |
| 5,761,986 | A | * | 6/1998 | Van Der Meer .............. 99/282 |
| 5,797,313 | A | * | 8/1998 | Rothley ........................ 99/483 |
| 5,862,738 | A | * | 1/1999 | Warne .......................... 99/281 |
| 5,865,097 | A | * | 2/1999 | Smit ........................... 99/323.3 |
| 5,946,936 | A | * | 9/1999 | Bengtson ..................... 62/457.2 |
| 6,000,317 | A | * | 12/1999 | Van Der Meer .............. 99/282 |
| 6,142,297 | A | * | 11/2000 | Price ........................... 206/212 |
| 6,164,189 | A | * | 12/2000 | Anson .......................... 99/281 |
| 6,202,540 | B1 | * | 3/2001 | Johnson et al. ............... 99/285 |
| 6,253,028 | B1 | * | 6/2001 | Roberson ..................... 392/442 |
| 6,286,415 | B1 | * | 9/2001 | Leung .......................... 99/288 |
| 2002/0051632 | A1 | * | 5/2002 | Kodden et al. ............. 392/471 |

OTHER PUBLICATIONS

Antique Samovar Advertizement. Sovetski Collection Magazine. p. 7. Fall 2001.*

* cited by examiner

Primary Examiner—Diego Gutierrez
Assistant Examiner—Gail Verbitsky
(74) Attorney, Agent, or Firm—Moonray Kojima

(57) ABSTRACT

The present invention relates to the lid of the liquid container appropriate for pouring drinks like coffee dropping from a coffee maker and the liquid container, more particularly the lid to be attached to the pouring inlet on the upper part of the liquid container, with a thermometer for measuring the temperature of the liquid inside the above said liquid container, exhibiting the indicator of temperature up on the said lid of the liquid container in order that by knowing the temperature of liquid inside easily from outside, coffee turned cool will not be served by mistake, and also the liquid container having the lid.

3 Claims, 3 Drawing Sheets

LID OF THE LIQUID CONTAINER AND THE LIQUID CONTAINER

BACKGROUND OF THE INVENTION

1. Field of the Invention

The present invention relates to the liquid container for business use, which is appropriate for containing various kinds of drinks like coffee and tea, especially for containing and keeping warm coffee made by a coffee maker.

2. Description of the Prior Art

The thermal flasks are used to contain coffee made by a coffee maker. As they are thermal, it is possible to serve hot coffee even without electricity when coffee is contained in the thermal flask so that it will be distributed in each shop or prepared on the table. In case of the drinks being cold, it can be served while it is that cold. Herein "thermal" shall mean "thermally insulating".

However, in case of being such a big flask as to be distributed to the shops, the temperature of the liquid, which has been contained therein, may change to inappropriate for serving when it takes long before it sells although there is no problem in case of quick selling. In other words, if it takes a lot of time to serve hot coffee after being contained in the flask, there is a problem that its temperature gets lower than that which is suitable for good drinking. This problem is hard to solve because the temperature of the contained liquid gets rapidly lower as generally the contained volume of the liquid becomes less and that problem is still difficult to avoid even though we use a flask which has a metal vacuum double bottle that is highly thermal.

SUMMARY OF THE INVENTION

The main purpose of the present invention is to provide for no cold coffee, which might have been served by mistake.

In other words, the purpose of this invention is to provide for a thermometer on the lid, for measuring the temperature of the liquid contained in the above said liquid container and the lid of the liquid container which exhibits the indicator of temperature above the above mentioned lid, the same lid being attached to the pouring inlet on the upper part of the liquid container and the liquid container having the above said lid.

Thus, according to the above mentioned construction, the temperature of the liquid contained can be easily known from outside as on the middle lid for closing the pouring inlet there is installed a thermometer exhibiting the indicator of temperature toward the above. In this way, it is possible to obtain the effect to prevent the drinks like coffee whose temperature has already gone down from being served by mistake.

Other purposes of the present invention will be clarified according the below description of the preferred embodiments.

DESCRIPTION OF THE PREFERRED EMBODIMENT

One example of the present invention will be more particularly described with reference to the accompanying drawings.

The liquid container 1 is put on the positioning plate 2 after being filled with the liquid to be contained, in such a way as to allow for pouring out the contained liquid out of the below part. The liquid container 1 is particularly apt for pouring and keeping warm coffee made by a coffee maker.

Figure 1:
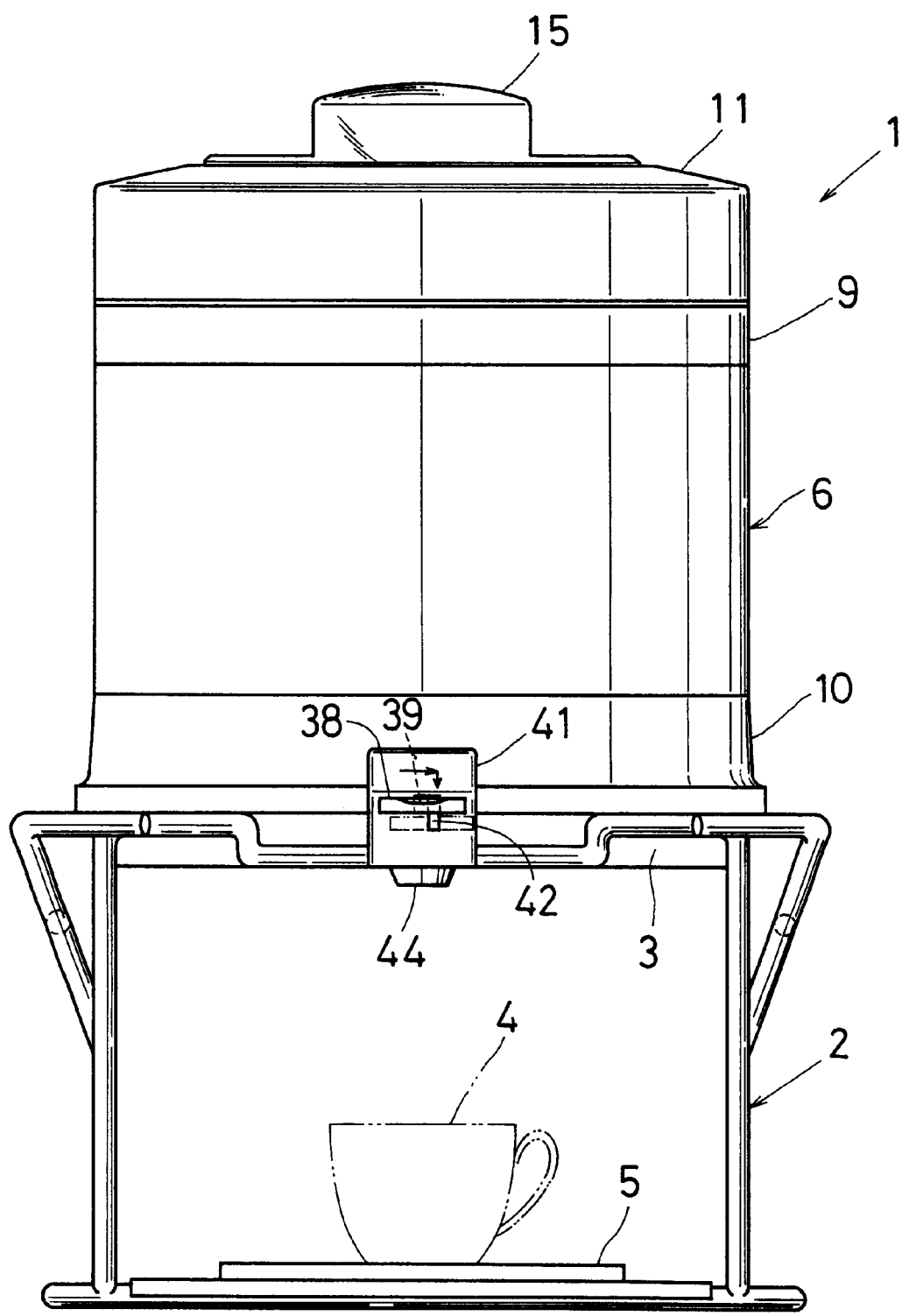
FIG. 1 Front view of the liquid container

As is shown in the FIG. 1, the liquid container 1 is made in the form of a column and can be fit onto the positioning plate 2 made of metal bars, provided with a step 3 on the outer circumferences of the below part for receiving the upper opening part of the positioning plate 2. On the below part of the positioning plate 2 there is installed a base material 5 to put the cup 4 or other things on, in such a way as to allow for setting and removing.

Figure 2:
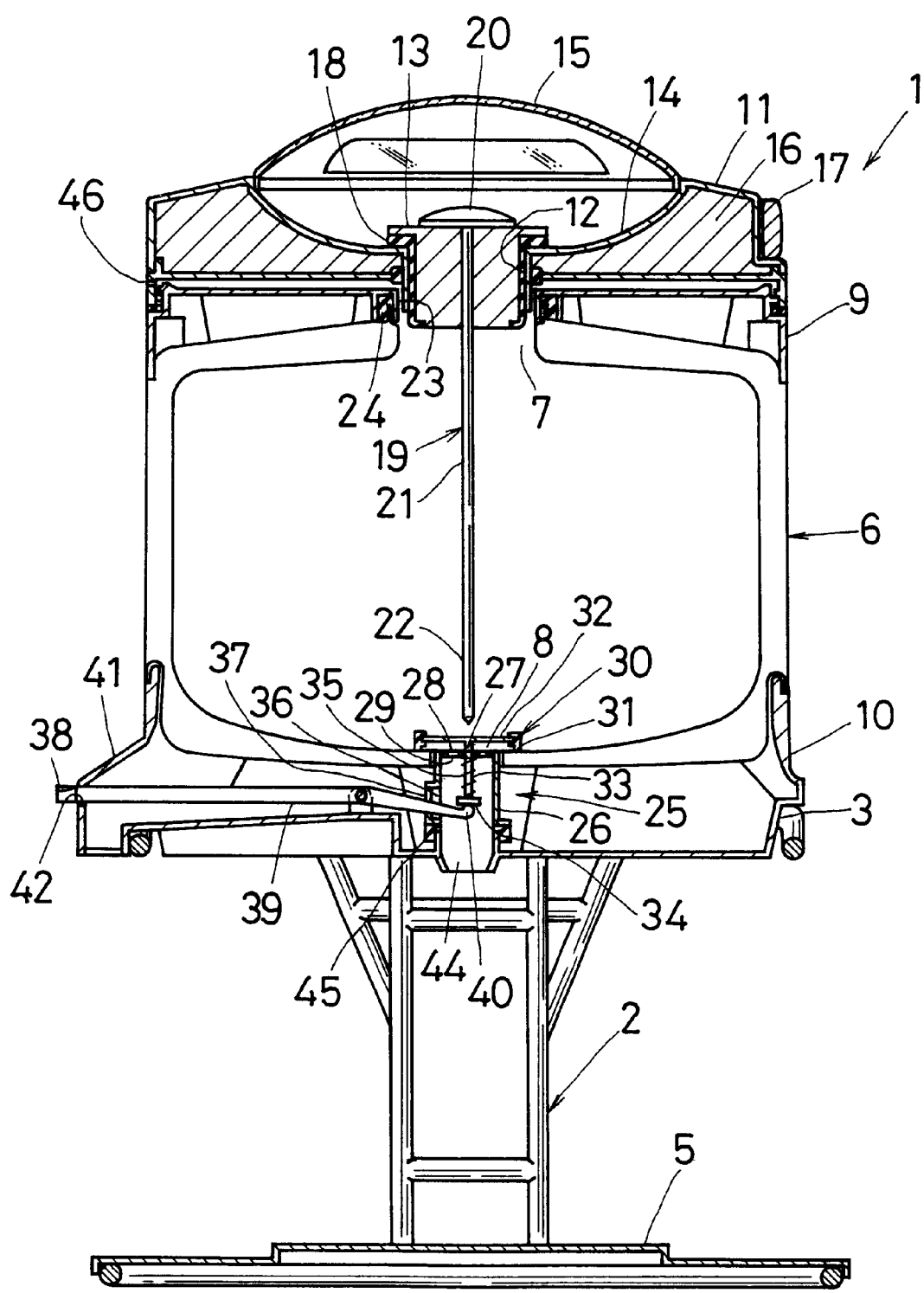
FIG. 2 Section view of the liquid container

The FIG. 2 is a section view of the liquid container 1. As is shown in the figure, the liquid container 1 exhibits a metal vacuum double flask, which is highly thermal, serving as a liquid container 6 for containing the liquid. A large container capable of containing, for example, 4 liters may be used. Furthermore, this liquid reserving container 6 may be put in between to constitute the above said liquid container 1.

The liquid reserving container 6 has a pouring inlet 7 on its upper end, for pouring the liquid and on its below end there is a pouring outlet 8 for sending down the liquid.

Above the liquid-reserving container 6 is the upper material 9 and below the same container 6 is the below material 10 installed and the lid material 11 is attached to the above mentioned upper material 9 in such a way as to allow for attaching and removing.

Figure 3:
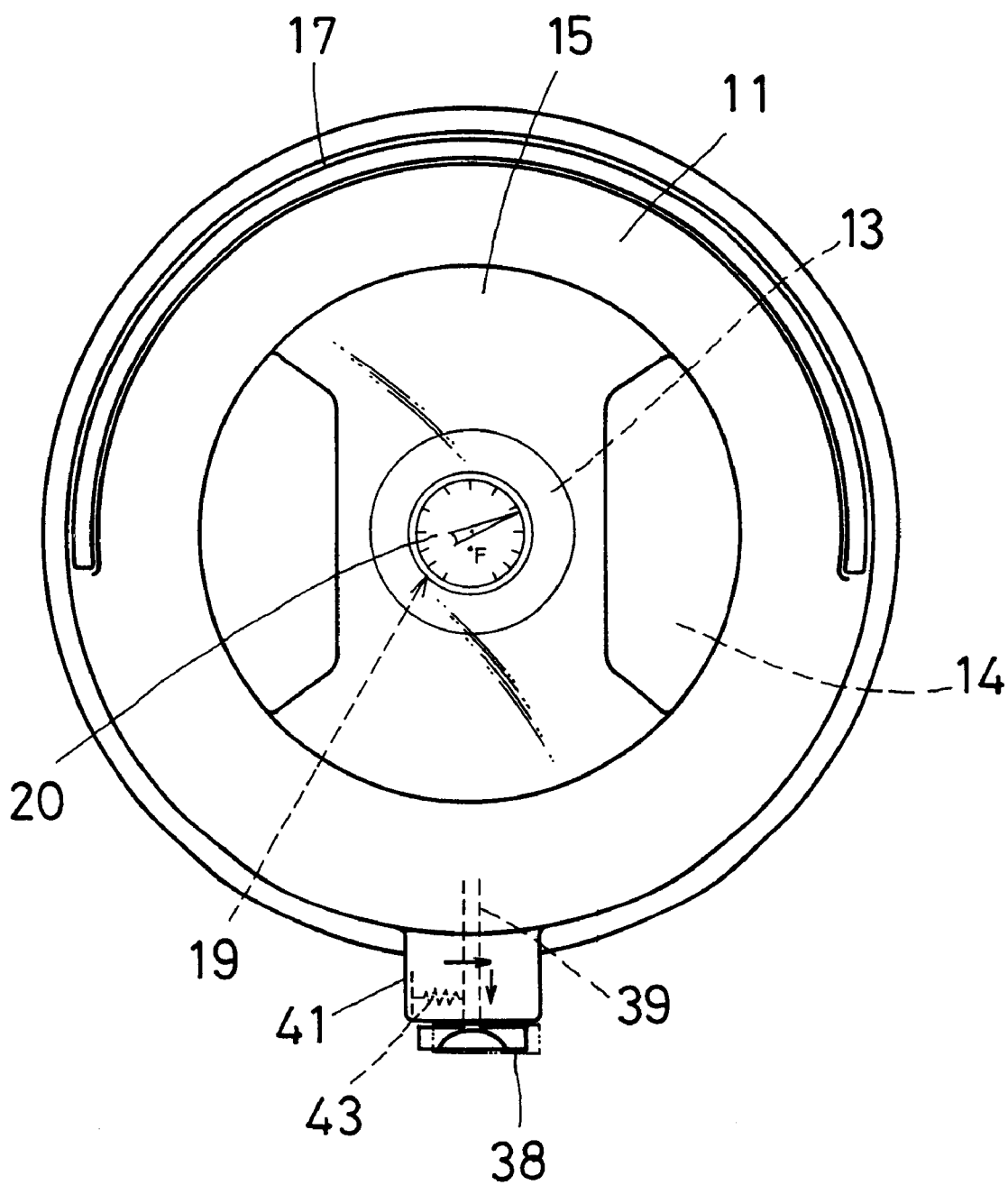
FIG. 3 Plan view of the liquid container

The lid material 11 forms the pouring inlet 12 a little bit smaller than the pouring inlet 7 of the liquid reserving container 6 around the upper side of the liquid reserving container 6, the above mentioned pouring inlet 12 being formed in such a way that the lid 13 can be attached and removed in order to close the said pouring inlet 12. On the upper side of the pouring inlet 12, there is formed a concave part 14 made in the form of a funnel to avoid any spilling when coffee is poured out from a coffee maker. Onto this concave part 14, the transparent attaching material 15 is to be attached in a way allowing for setting and removing. By attaching the attaching material 15, thermal effects can be raised and it is possible to prevent the concave part 14 from getting dirty. As the attaching material 15 is transparent, its inner part, as is shown in the FIG. 3, can be seen through. Furthermore, the lid material 11 is covered with a thermal material 16 to elevate the thermal efficiency while on the outer part, there is attached a grip which allows for raising and inclining.

The above mentioned lid 13 is provided with a packing 18 in the part adjacent to the pouring inlet 12 of the lid material 11, thus avoiding the spill of the vapor from the pouring inlet 12 and exhibiting the thermometer 19 for measuring the liquid temperature inside. For the thermometer 19, a bimetal thermometer may be used. In this case, the upper side of the bar 21 may be received by the lid 13 so that the indicator of temperature 20 on the upper side will be exposed above the lid 13. The temperature sensor part 22 on the below part of the bar 21 may be located around the bottom of the liquid reserving container 6. As mentioned above, the upper side of the lid 13 is covered with the attaching material 15 which is transparent, therefore, as is shown in the FIG. 3, the above said indicator of temperature 20 can be seen through and the temperature of the contained liquid can be readily looked at.

The upper material 9 forms the opening part 23 on the center of the upper side, receiving the liquid reserving container 6 with the packing 24 in order that the pouring inlet 7 of the liquid reserving container 6 is located below the above mentioned opening part 23. Furthermore, on the pouring outlet 8 at the bottom of this liquid reserving container 6 there is provided a device designed for opening and closing this pouring outlet 8.

This device for opening and closing the way out may be constructed as follows. There is protruded a pouring tube 26 down on the pouring outlet 8. On the upper side inside the pouring tube 26 there is a piercing hole 27 in the center, around which the retaining plate material 29 is installed with a piercing hole 28 through which liquid can pass. Thus, this retaining material 29 is to retain the closing material 30 for closing the pouring outlet 8 of the liquid reserving container 6.

The closing material 30 is larger than the pouring outlet 8 of the liquid reserving container 6, provided with the closing plate 32 retaining the packing 31 on the outer edge and a piercing axle 33 in the shape of a bar which is vertically set from the below side of this closing plate 32, together with a stopping plate 34 in the shape of a disk to be attached below the end of this piercing axle 33. This closing material 30 retains the piercing axle 33 inside the piercing hole 27 of the above said retaining material 29 while in the middle of the retaining material 29 and the stopping material 34 is a compressive coiling spring 35. In an ordinary condition, the compressive coiling spring 35 taps the pouring outlet 8 by force of resilience, thus avoiding the liquid falling down. However, when the closing material 30 is pushed up against a resilient force, the pouring outlet 8 is opened and liquid falls down.

In order to make this function, on the lateral side of the above said pouring tube 26 there is formed a concave 36 with the inner surface retracted and in this concave 36 there is formed a cut out part 37 which is elongated.

The operating rod 39 having a operating piece 38 on its end is pierced into this cut out part 37 and the operating part 40 on the tip of the operating rod 39 may be brought close or adjacent to the below end of the stopping plate 34 of the above mentioned closing material 30.

The operating rod 39 is supported inside the below side material 10 and the operating piece 38 is protruded from the operating part 41 set forward from the below material 10. Before the operating part 41 there is formed a piercing hole 42 through which the operating rod 39 passes and this piercing hole 42 is formed in the shape of the letter L reversed. In other words, in order to pour the liquid the operating piece 38 should be pushed down so that the closing material 30 will be pushed up by a resilient force of the compressive coiling spring 35 and against the weight of the liquid and in order to prevent malfunction, the operating piece 38 cannot be pushed down until it is horizontally moved once. After being operated, the operating piece 38 turns back by a horizontal move of the operating piece 38 from the operating rod 39 on its supporting point. However, in order to obtain a good force of turning back, the stretching coiling spring 43 may be placed between the operating rod 39 and the inner part of the operating part 41.

On the below center of the below material 10 there is formed a pouring part 44 in the shape of a cylinder with the below end that opens and the pouring part 44 is to be connected to the above mentioned pouring tube 26 with the packing 45 when retaining the container 6. In order to make liquid go down smoothly, there is formed a piercing hole 46 on the connecting part of the upper material 9 with the above mentioned lid material 11.

According to the liquid container 1 thus constructed, it is possible to pour coffee from a coffee maker easily when the attaching material 15 and the lid 13 are removed even though the lid material 11 is not removed. After the container is filled with liquid, a tight condition can be obtained when the lid is set and at the same time on the indicator of temperature 20 of the thermometer 19 which is retained, the temperature of the inner liquid is shown. The content of this indicator can be seen even from the above side of the attaching material 15. Thus, it is possible to avoid liquid, which has turned cold, from being poured out by mistake. Furthermore, as the temperature sensor part 22 of the thermometer 19 is located at the bottom of the liquid reserving container 6, it is possible to know the temperature of the liquid itself, which is to be poured out accurately.

In addition, the pouring out can be carried out in a way that liquid runs down automatically by providing a opening and closing device at the pouring outlet 8 which is formed at the bottom of the liquid reserving container 6, with a short route through which liquid passes to be poured out, thus keeping liquid to be poured out from getting cool. In this way, it is possible to lessen the difference between the detected temperature and the real temperature of the liquid to be poured out.

According to the liquid container 1 whose liquid reserving container 6 is a metal vacuum double bottle, it is possible to set a liquid level gauge for knowing the content volume when using an air pump pouring structure although it may become complicated, however, when using the above mentioned pouring structure consisting in liquid dropping down from the below part of the liquid container, it is impossible to set a level gauge. However, according to the present invention, it is possible to know the temperature of the contained liquid as explained above, and the content volume can be known from the way the temperature varies. This means, when the content volume decreases, the temperature of the liquid goes down, and at the same time it is possible to take a prompt measure such as exchanging the content or refilling the liquid. Therefore, without complicating the structure by putting the level gauge or making cool the liquid to be poured, it is possible to easily prevent the container from being empty of coffee by mistake. In addition when coffee is reserved in the container, a level gauge does not serve good because coffee remains black on the surface, but when using the thermometer 19, the above mentioned effects are very workable.

Furthermore, as the liquid reserving container 6 is without a liquid level gauge and provided with the packing 18 and the attaching material 15, comprising a metal vacuum double bottle, it can have more thermal effects, thus constituting a large liquid container 1. In addition, as it is constructed as simply as mentioned before, it is possible to manufacture the container at a lower cost and its operation is simple. Therefore, this liquid container is very useful especially when the drink is distributed from one place to many and there served.

What is claimed is:

1. A thermally insulated container for a liquid comprising:
   a base having a top part connected to a bottom part and forming a space therein for insertion of a cup;
   a thermally insulated holder having a bottom portion, a top portion and an intermediate portion interconnecting said bottom portion and said top portion, said holder containing said liquid at a stable temperature, wherein said bottom portion of said holder is disposed on said top part of said base;
   first means disposed on said bottom portion for controlling flow of said liquid from said holder, said first means comprising:

a hole in said bottom portion and located above said cup placed into said space of said base;

a plug positioned above said hole and movable verically to open and close said hole;

a vertically disposed rod connected to said plug at a bottom thereof;

a spring on said rod to normally hold said plug in a closed state against and closing said hole; and a manually operable lever disposed in front of said bottom portion of said holder and accessible to an operator, said lever being connected to said rod for causing said rod to move against force of said spring to cause said plug to move away from said hole to provide an opening in said hole thereby to enable said liquid to flow through said opening in said hole by force of gravity from said holder into said cup disposed in said space of said base and below said hole; wherein upon release of said lever, by force of said spring, said plug connected to said rod returns to a position which closes said hole; and second means movably disposed at said top portion of said holder for providing closure of said top portion and for preventing leakage of said liquid therefrom, said second means comprising:

a movable lid attachable to said top portion of said holder;

a temperature sensing column extending downward into said holder from said top portion through said intermediate portion and to said bottom portion above said plug disposed above said hole, so as to sense temperature of said liquid in said holder;

temperature indicator means connected to said temperature sensing column for indicating temperature sensed by said temperature sensing column; and window means disposed on top of said temperature indicator means for outside visual access to said temperature indicator means.

2. The container of claim 1, wherein said holder comprises a metal vacuum double bottle.

3. The container of claim 1, wherein said window means comprises a transparent window.

* * * * *